UNITED STATES PATENT OFFICE.

DANIEL M. ADEE, OF NEW YORK, N. Y.

IMPROVEMENT IN THE MANUFACTURE OF CAST-STEEL.

Specification forming part of Letters Patent No. 45,008, dated November 15, 1864.

*To all whom it may concern:*

Be it known that I, DANIEL M. ADEE, of the city, county, and State of New York, have invented a new and useful Improvement in the Manufacture of Steel; and I do hereby declare that the following is a full, clear, and exact description of the same.

This invention relates to a composition the principal ingredients of which are antimony or lime with franklinite or charcoal, and which, when brought in contact with wrought-iron and melted with the same in a crucible, produces cast-steel of superior quality.

The composition which I generally use consists of manganese, charcoal, sal-ammoniac, red lead, antimony, lime, red brick-clay, glass, and franklinite, though it must be remarked that some of these ingredients can be dispensed with without rendering the composition unfit for use. The proportion in which I mix these ingredients together is about as follows: manganese, three ounces; charcoal, three ounces; sal-ammoniac, one and one-half ounce; red lead, one ounce; antimony, one and one-half ounce; lime, one ounce; red brick-clay, two ounces; glass, two ounces; franklinite, six and one-half ounces, to be melted with iron, fifty pounds.

The above composition I put, with the iron, in a crucible and melt the whole together, and then I pour the melted mass into molds of the desired form, the same as other cast-steel.

The steel produced by the use of my composition is free from seams and cracks. It is of uniform texture and of a superior quality.

The principal ingredients in the above composition are antimony and lime, either of which, when used with franklinite or charcoal, or both, will produce a decided effect on wrought-iron, though I find that the whole composition, when mixed together, as above stated, produces a still better result.

I claim as new and desire to secure by Letters Patent—

1. The use of antimony in the manufacture of cast-steel.

2. The use of lime in the manufacture of cast-steel, substantially in the manner described.

3. The use of the composition hereinbefore specified, and made of the ingredients above set forth, for the purpose described.

DANIEL M. ADEE.

Witnesses:
WM. F. McNAMARA,
M. M. LIVINGSTON.